May 21, 1935.  R. F. DOW  2,002,081
HYDRAULIC SLACK TAKE-UP DEVICE
Filed May 6, 1932
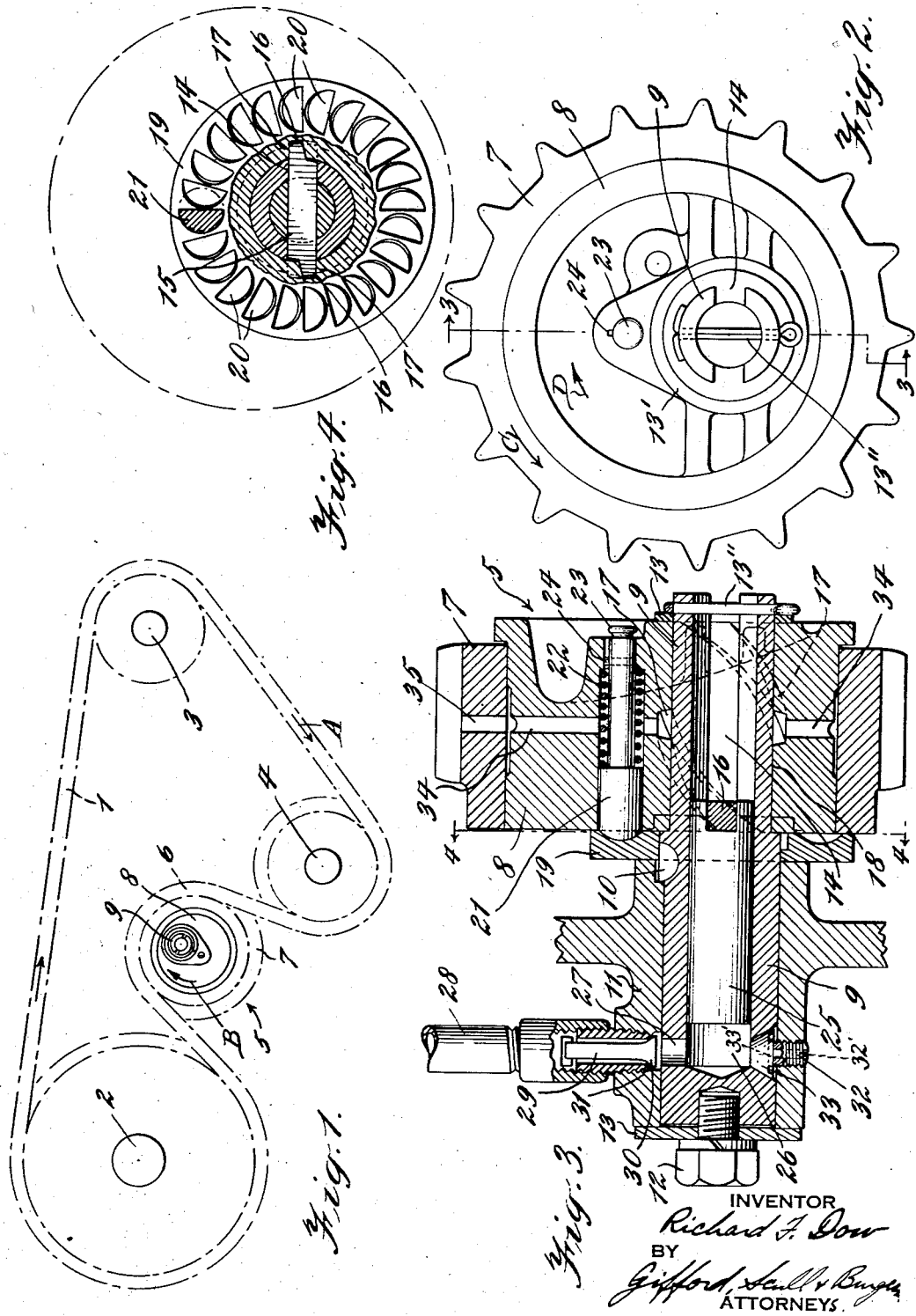

Patented May 21, 1935

2,002,081

UNITED STATES PATENT OFFICE 2,002,081

HYDRAULIC SLACK TAKE-UP DEVICE

Richard F. Dow, Hartford, Conn., assignor to The Whitney Mfg. Co., Hartford, Conn., a corporation of Connecticut Application May 6, 1932, Serial No. 609,600

8 Claims. (Cl. 74—242.11)

This invention relates to a novel and improved form of slack take-up device of the type described and claimed in my copending application, Serial No. 360,550, Patent No. 1,913,872.

The novel features will be best understood from the following description and the annexed drawing, in which I have shown a selected embodiment of the invention, and in which:

Fig. 1 is a diagrammatic view of a chain drive having my invention employed therein.

Fig. 2 is a face view of the take-up device appearing in Fig. 1.

Fig. 3 is a section on the line 3—3 of Fig. 2.

Fig. 4 is a section on the line 4—4 of Fig. 3.

The invention finds particular utility in connection with taking up of slack automatically in chain drives, such as used, for example, in the operation of timing mechanism on automobiles. For the sake of simplicity, I will hereinafter refer to the device as used with a sprocket and a chain, although I do not intend thereby to limit myself to the use of the invention with a chain drive to the exclusion of a belt or other drive where it may be found useful.

Referring first to Fig. 1, I have indicated therein a chain drive embodying a chain 1 engaging sprockets on three shafts 2, 3 and 4. The slack may be taken up by my device which is indicated generally at 5 and which engages a loop 6 of the chain between the shafts 2 and 4.

The device comprises a sprocket 7 provided with the usual teeth and forming an idler which may rotate upon a bearing 8 of cylindrical form and which is mounted upon a pivot formed of a sleeve 9 eccentrically disposed with respect to the axis of the bearing. The sleeve 9 may be keyed as shown at 10 into a fixed bearing 11 and extends forwardly or to the right of Fig. 3 to support the movable bearing 8. The sleeve may be secured in place at the rear thereof by means of a screw 12 threaded into the rear end of the sleeve 9 and having its head forced against a washer 13 engaging the fixed bearing 11. The bearing may be retained on the sleeve as by a washer 13′ and a cotter pin 13″.

As described and claimed in my aforesaid copending application, the sleeve 9 is provided with longitudinally extending slots 14 disposed coaxially of the sleeve and through which extends a pin 15, the ends 16 of which are received in spiral grooves 17 in the inner cylindrical surface 18 of the bearing 8. By this arrangement, when the pin 15 is moving towards the front or towards the right of Fig. 3, the pin 15 will cause rotation of the bearing 8 in the direction of the arrow D in Fig. 2.

Secured to the sleeve is a flange 19, in the face of which are a plurality of ratchet teeth formed by recesses 20 adapted to receive a pawl pin 21. This pawl and ratchet arrangement normally permits rotation of the bearing 8 in the direction of the arrow D in Fig. 2, while preventing rotation thereof in the opposite direction. The pin 21 is slidably mounted in the bearing 8 and preferably is disposed substantially parallel to the axis of the pivot formed by the sleeve 9 and is normally urged towards the left of Fig. 3 as by a compression spring 22. The pawl pin may be provided with a handle 23 by means of which it may be retracted, and it also may be provided with a transverse locking pin 24 sliding in a groove in the bearing, so that the pawl pin may be held out of operative engagement with the teeth on the flange 19 by retracting it to the right of Fig. 3 and then turning it slightly on its axis until the pin 24 engages the face of the bearing 8.

The pin 15 is mounted on the front end of a piston 25 which slides in the sleeve 9 as a cylinder. Preferably the pin is of the square cross section shown in Fig. 3 in order to fit a correspondingly shaped slot in the front end of the piston, and the diagonally opposite corners of the pin are cut off as indicated in Figs. 3 and 4 so as to fit the grooves 17. The piston is operated by means of hydraulic pressure supplied to the space 26 at the rear of the piston, this pressure being preferably furnished by oil entering that space through an opening 27 in the wall of the cylinder from a supply line 28. A suitable one-way valve 29 is provided which has its head 30 engaging a seat 31 so as to prevent escape of the liquid from the space 26 while permitting it to pass into that space from the line 28. In case it is desired to relieve the pressure formed by the liquid in the space 26, a suitable relief outlet is provided, here shown as being in the form of a plug 32 threaded into the fixed support 11 and holding a valve 33 in place against its seat, the seat communicating with the space 26. The plug 32 is provided with a central opening 32′, and this opening communicates with a slot 33′ in the valve 33 so that upon loosening of the plug, oil may escape through the opening 32′.

Preferably, the liquid used is oil, although, of course, other liquids may be employed where found desirable. By the term "liquid" I do not intend to limit myself to oil or water, as it is contemplated that other substances may be used.

The line 28 may, for example, be connected either to the pump of the oil system of an automobile or may be connected to a separate supply of heavy grease of a semi-fluid consistency.

In operation, the pin 21 is first retracted and held out of engagement with the ratchet teeth formed by the recesses 20. Next, the piston 25 is forced to the left as viewed in Fig. 3 by means of a suitable tool which may enter the open end at the right of the sleeve 9. The relief outlet 32 may be opened for this purpose. The above operation will cause rotation of the bearing 8 on the sleeve 9 in a direction opposite to that indicated by the arrows B and D in Figs. 1 and 2. The pawl pin 21 is then released so that it may engage the ratchet teeth which will prevent further rotation of the bearing in the direction in which it has just been rotating. The outlet 32 is now closed and a liquid admitted to the space 26 to fill that space, this liquid tending to force the piston 25 to the right of Fig. 3 and thus to rotate the bearing 8 in the direction of the arrows B and D in Figs. 1 and 2. The chain I has its loop 6 trained over the portion of the sprocket 7 which has the greatest eccentricity with respect to the pivot 9 as shown in Fig. 1, and so long as the loop 6 is tight, the bearing 8 will resist rotation by movement of the piston 25. As slack occurs, however, rotation in the direction of the arrows B and D will take place, the pawl and ratchet arrangement described preventing return movement of any great amount, and return movement of any amount at all being resisted and substantially prevented by the hydraulic pressure exerted on the piston 25.

The arrangement described has numerous advantages, among which is the fact that it provides a positive force for the rotation of the bearing 8 which can be readily designed for any given pressure by varying the size of the piston unit. If necessary and found desirable, it can be used without the inlet valve 29, but this valve is of utility particularly in case of back firing or any other situation which may arise in practice and which tends to cause reversal of the direction in which the chain is moving.

The chain is normally moving in the direction indicated by the arrow A in Fig. 1, and that means that the sprocket 7 is rotating in the direction indicated by the arrow C in Fig. 2. Normally the bearing 8 is relatively stationary with respect to the sprocket, although it rotates to take up slack, as described above, the piston 25 moving towards the right of Fig. 3 to prevent any back movement and the oil or other liquid flowing into the space 26 to hold the piston towards the right in its forward position and to hold the pin 15 tightly in the slots 14 and grooves 17. For example, if the engine to which the drive of Fig. 1 is connected should back-fire, or if for some other reason the direction of movement of the chain should be reversed and then suddenly resume its movement in the normal direction, the result would be to exert a sudden and violent force upon the piston 25, tending to force it towards the left of Fig. 3. While if a pump were used to force the oil into the space 26, this movement of the piston might be adequately resisted, nevertheless the valve 29 forms a positive means for preventing movement of the piston and for cushioning the shock of the reversal by means of the liquid in the space 26. This reverse movement of the bearing would, of course, be resisted by the pawl and ratchet arrangement limiting the movement to the distance between teeth of the ratchet, but the valve 29 limits the movement to a much smaller amount, and in fact, to all intents and purposes, prevents any substantial movement of the piston.

The piston 25 is preferably unpacked in the cylinder, leaving a slight clearance between the cylinder and the piston, so that a certain amount of oil may pass along the surfaces thereof and find its way into the grooves 17 and thence into oil passages 34 in the bearing and 35 in the sprocket. By this arrangement, the parts may be properly lubricated as well as operated to take up the slack.

While I have shown the invention as embodied in a specific form, it is to be understood that various changes in details may be made without departing from the scope of the invention, and I therefore do not intend to limit myself except by the appended claims.

I claim:

1. A slack take-up device comprising an idler adapted to engage a chain, a bearing on which said idler is rotatably mounted, a pivot supporting said bearing and disposed eccentrically to its axis, a pin movable lengthwise of said pivot, a connection between said pin and bearing adapted to cause rotation of said bearing by said lengthwise movement of the pin, a piston operatively connected to said pin, a cylinder within which said piston is movably received, means to supply liquid under pressure to said cylinder to move said piston in one direction, and means to prevent backward flow of said liquid from said cylinder, thereby preventing movement of said piston in the opposite direction.

2. A slack take-up device comprising an idler adapted to engage a chain, a bearing on which said idler is rotatably mounted, a pivot supporting said bearing and disposed eccentrically to its axis, a pin movable lengthwise of said pivot, a connection between said pin and bearing adapted to cause rotation of said bearing by said lengthwise movement of the pin, a piston disposed coaxially of said pivot and having said pin secured thereto adjacent one end thereof, a cylinder in which said piston is adapted to slide, an inlet for liquid into said cylinder into a space beyond the other end of the piston, and means to maintain a sufficient pressure on the liquid in said space to substantially prevent movement of the piston into said space.

3. A slack take-up device comprising an idler adapted to engage a chain, a bearing on which said idler is rotatably mounted, a pivot supporting said bearing and disposed eccentrically to its axis, a pin movable lengthwise of said pivot, a connection between said pin and bearing adapted to cause rotation of said bearing by said lengthwise movement of the pin, a piston disposed coaxially of said pivot and having said pin secured thereto adjacent one end thereof, a cylinder in which said piston is adapted to slide, an inlet for liquid into said cylinder beyond the other end of the piston, and a valve preventing flow of the liquid out of the inlet.

4. A slack take-up device comprising an idler adapted to engage a chain, a bearing on which said idler is rotatably mounted, a pivot supporting said bearing and disposed eccentrically to its axis, a pin movable lengthwise of said pivot, a connection between said pin and bearing adapted to cause rotation of said bearing by said lengthwise movement of the pin, a piston disposed coaxially of said pivot and having said pin secured thereto adjacent one end thereof, a cylinder in which said piston is adapted to slide, an inlet for liquid into said cylinder beyond the other end of the piston, a valve preventing flow of the liquid out of the inlet, and a relief outlet from the cylinder adjacent said inlet.

5. A slack take-up device comprising an idler adapted to engage a chain, a bearing on which said idler is rotatably mounted, a pivot supporting said bearing and disposed eccentrically to its axis, a pin movable lengthwise of said pivot, a connection between said pin and bearing adapted to cause rotation of said bearing by said lengthwise movement of the pin, a piston operatively connected to said pin, a cylinder receiving said piston, oil passages in said pivot and bearing and communicating with said cylinder, and means for supplying oil to said cylinder to actuate the piston, said piston and cylinder having a slight clearance therebetween, whereby oil may work along the piston to said passages.

6. A slack take-up device comprising an idler adapted to engage a chain, a bearing on which said idler is rotatably mounted, a pivot supporting said bearing and disposed eccentrically to its axis and in the form of a sleeve, a pin disposed in said sleeve and movable lengthwise thereof, a connection between said pin and bearing adapted to cause rotation of said bearing by said lengthwise movement of the pin, a piston operatively connected to said pin, a cylinder receiving said piston, oil passages in said pivot and bearing and leading from the interior of said sleeve to the contacting surfaces between the idler and the bearing, and means for supplying oil to said cylinder to actuate the piston, said piston and cylinder having a slight clearance therebetween, whereby oil may work along the piston into said sleeve and thence to said passages.

7. A slack take-up device comprising an idler adapted to engage a chain, a bearing on which said idler is rotatably mounted, a pivot supporting said bearing and disposed eccentrically to its axis and in the form of a sleeve, a pin disposed in said sleeve and movable lengthwise thereof, a connection between said pin and bearing adapted to cause rotation of said bearing by said lengthwise movement of the pin, a piston operatively connected to said pin, a cylinder receiving said piston, oil passages in said sleeve leading from the interior thereof to the contacting surfaces between said bearing and pivot, and means for supplying oil to said cylinder to actuate the piston, said piston and cylinder having a slight clearance therebetween, whereby oil may work along the piston into said sleeve and thence to said passages.

8. A slack take-up device comprising an idler adapted to engage a chain, a bearing on which said idler is rotatably mounted, a pivot supporting said bearing and disposed eccentrically to its axis, a pin movable lengthwise of said pivot, a connection between said pin and bearing adapted to cause rotation of said bearing in one direction by said lengthwise movement of the pin, a piston operatively connected to said pin, a cylinder within which said piston is movably received, means to supply liquid under pressure to said cylinder to move said piston in one direction, and means to prevent backward flow of said liquid from said cylinder, thereby preventing movement of said piston in the opposite direction, and a pawl and ratchet device preventing rotation of said bearing in the direction opposite to that first named.

RICHARD F. DOW.